(12) United States Patent
Kitawaki et al.

(10) Patent No.: US 9,613,648 B2
(45) Date of Patent: Apr. 4, 2017

(54) ALUMINUM ALLOY PLATE FOR MAGNETIC DISC SUBSTRATE, METHOD FOR MANUFACTURING SAME, AND METHOD FOR MANUFACTURING MAGNETIC DISC

(71) Applicant: UACJ Corporation, Tokyo (JP)

(72) Inventors: Kotaro Kitawaki, Tokyo (JP); Minoru Hayashi, Tokyo (JP); Yoshiji Hashimoto, Tokyo (JP); Toshikazu Hisamoto, Tokyo (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 15/117,209

(22) PCT Filed: Sep. 24, 2015

(86) PCT No.: PCT/JP2015/004851
§ 371 (c)(1),
(2) Date: Aug. 8, 2016

(87) PCT Pub. No.: WO2016/047138
PCT Pub. Date: Mar. 31, 2016

(65) Prior Publication Data
US 2016/0351224 A1 Dec. 1, 2016

(30) Foreign Application Priority Data
Sep. 27, 2014 (JP) ................................. 2014-197651

(51) Int. Cl.
*C22F 1/047* (2006.01)
*C22C 21/06* (2006.01)
(Continued)

(52) U.S. Cl.
CPC .............. *G11B 5/8404* (2013.01); *B21B 1/22* (2013.01); *B22D 11/00* (2013.01); *B22D 11/049* (2013.01);
(Continued)

(58) Field of Classification Search
CPC .......... C22F 1/047; C22C 21/06; C22C 21/08
See application file for complete search history.

(56) References Cited

FOREIGN PATENT DOCUMENTS

| CN | 101381828 | 3/2009 |
|---|---|---|
| JP | S56105846 | 8/1981 |

(Continued)

OTHER PUBLICATIONS

"International Search Report (Form PCT/ISA/210) of PCT/JP2015/004851", mailed on Dec. 22, 2015, with English translation thereof, pp. 1-4.

(Continued)

*Primary Examiner* — Lois Zheng
(74) *Attorney, Agent, or Firm* — Jianq Chyun IP Office (57) ABSTRACT

An aluminum alloy plate for a magnetic disk substrate with a flat and smooth ground surface, a production method by which the aluminum alloy plate can be produced at low cost and a magnetic disk are shown. An aluminum alloy plate for a magnetic disk substrate which comprises an aluminum alloy containing Mg: 3.0 to 8.0 mass % (hereinafter %), Cu: 0.005 to 0.150%, Zn: 0.05 to 0.60%, Cr: 0.010 to 0.300%, Fe: 0.001 to 0.030%, Si: 0.001 to 0.030%, (Ti+V+Zr): 0.0010 to 0.0100%, B: 0.0001 to 0.0010% with a balance being Al and inevitable impurities, wherein the density of a Ti—V—B—Zr-based inclusion having a maximum diameter exceeding 5 μm is 0 piece/6000 mm² and the density of a Ti—V—B—Zr-based inclusion having a maximum diam- (Continued)

eter of 3 to 5 μm is 1 piece/6000 mm² or less; a production method thereof; and a method for producing a magnetic disk.

3 Claims, 1 Drawing Sheet

(51) Int. Cl.
  *B22D 11/00* (2006.01)
  *G11B 5/84* (2006.01)
  *B22D 11/049* (2006.01)
  *B21B 1/22* (2006.01)
  *B22D 15/00* (2006.01)
  *C22C 21/08* (2006.01)
  *C23C 18/31* (2006.01)
  *C23C 18/36* (2006.01)
  *C23F 17/00* (2006.01)
  *G11B 5/735* (2006.01)
  *C22F 1/00* (2006.01)

(52) U.S. Cl.
  CPC .............. *B22D 15/00* (2013.01); *C22C 21/06* (2013.01); *C22C 21/08* (2013.01); *C22F 1/047* (2013.01); *C23C 18/31* (2013.01); *C23C 18/36* (2013.01); *C23F 17/00* (2013.01); *G11B 5/735* (2013.01); *B21B 2001/221* (2013.01); *B21B 2001/225* (2013.01); *C22F 1/00* (2013.01)

(56) References Cited

FOREIGN PATENT DOCUMENTS

| | | |
|---|---|---|
| JP | H02-097639 | 4/1990 |
| JP | H02-111839 | 4/1990 |
| JP | H06-025785 | 2/1994 |
| JP | H11-315338 | 11/1999 |
| JP | 2002173718 | 6/2002 |
| JP | 2009242843 | 10/2009 |
| JP | 2011102415 | 5/2011 |
| JP | 2013023737 | 2/2013 |
| JP | 2013112884 | 6/2013 |
| JP | 2014196530 | 10/2014 |
| JP | 5762612 | 8/2015 |

OTHER PUBLICATIONS

"1st Office Action of China Counterpart Application", with English translation thereof, issued on Sep. 27, 2016, p. 1-p. 12.

ALUMINUM ALLOY PLATE FOR MAGNETIC DISC SUBSTRATE, METHOD FOR MANUFACTURING SAME, AND METHOD FOR MANUFACTURING MAGNETIC DISC

CROSS-REFERENCE TO RELATED APPLICATION

This application is a 371 application of the international PCT application serial no. PCT/JP2015/004851, filed on Sep. 24, 2015, which claims the priority benefit of Japan application no. 2014-197651, filed on Sep. 27, 2014. The entirety of each of the above-mentioned patent applications is hereby incorporated by reference herein and made a part of this specification.

TECHNICAL FIELD

The present invention relates to an aluminum alloy plate for a magnetic disk substrate having a flat and smooth plated surface, a production method by which the aluminum alloy plate can be produced at low cost and a method for producing a magnetic disk using the aluminum alloy plate.

BACKGROUND ART

Magnetic disks made of aluminum alloys which are used for the storage units of computers are produced from an aluminum alloy substrate obtained using the JIS 5086 alloy (made of Mg: 3.5 to 4.5 mass %, Fe≤0.50 mass %, Si≤0.40 mass %, Mn: 0.20 to 0.70 mass %, Cr: 0.05 to 0.25 mass %, Cu≤0.10 mass %, Ti≤0.15 mass %, Zn≤0.25 mass % with a balance being Al and inevitable impurities, which has excellent mechanical properties and excellent formability as well as excellent plating property, an aluminum alloy substrate in which the amounts of Fe, Si and the like, which are impurities of the JIS 5086 alloy, are limited to make the intermetallic compounds in the matrix small, or an aluminum alloy substrate to which Cu or Zn has been added to improve the plating property and the like.

A general magnetic disk made of an aluminum alloy is produced by first producing a circular aluminum alloy substrate, plating the circular aluminum alloy substrate and then sputtering a magnetic material to the substrate surface.

For example, a magnetic disk made of the JIS5086 aluminum alloy is produced by the following steps. First, the aluminum alloy is cast, and the cast slab is hot rolled and then cold rolled. The alloy is annealed according to the need, and a rolled material is thus produced. Next, a circular shape is punched out of the rolled material, and the circular aluminum alloy plates are piled. The pile is subjected to pressure annealing where the pile is annealed while pressure is applied to the pile from top and bottom to flatten the pile, and a circular aluminum alloy substrate is thus produced.

Thus produced circular aluminum alloy substrate is subjected to lathing, grinding, degreasing, etching and zincating (Zn substitution treatment), which are pre-treatment, and then to base treatment, namely electroless plating with Ni—P, which are hard nonmagnetic metals. The plated surface is polished, and then a magnetic material is sputtered. Thus, a magnetic disk made of an aluminum alloy is produced.

Recently, it has been desired that magnetic disks have a larger capacity and a higher density due to the needs for multimedia and the like, and an areal memory density of 2 Tb/in$^2$ will be achieved in the near future. In order to increase the memory density of a magnetic disk, it is necessary to reduce the number of plating pits (holes) on the magnetic disk surface, which cause errors when the data are read, and it is desired that the plated surface be highly flat and smooth.

Large hollows in the surface of an aluminum alloy substrate are known to be a cause of the generation of plating pits, and it has been found that the large hollows are created when foreign materials on the substrate surface, such as coarse non-metal inclusions and intermetallic compounds, fall off during grinding or pre-plating treatment.

Due to the circumstances, the reduction in number of the foreign materials in the aluminum alloy substrate has been greatly desired recently, and investigations on this point have been made. PTL 1 describes a method for micronizing the foreign materials such as an Al—Fe—Mn-based intermetallic compound by increasing the cooling rate during the solidification in the casting step.

PTL 2 describes a method for reducing the amounts of Ti, V and Zr, which are impurities contained in molten aluminum, prior to purification by segregation by effectively utilizing the reaction with B. By using raw metal with high purity produced by the method as a starting material for an aluminum alloy plate for a magnetic disk substrate, the generation of foreign materials such as $TiB_2$, $VB_2$ and $ZrB_2$ is inhibited.

CITATION LIST

Patent Literature

PTL 1: JP-A-S56-105846
PTL 2: JP-A-2002-173718

The method described in PTL 1, however, still has problems because the numbers of coarse inclusions cannot be reduced and thus the aimed high flatness and smoothness cannot be obtained, although the Al—Fe—Mn-based intermetallic compound can be micronized.

In addition, although the numbers of coarse inclusions are reduced by conducting a plurality of refining steps to increase the purity as described in PTL 2, there are still problems because the number of the steps is larger than that of general refining and the cost is thus increased.

DISCLOSURE OF INVENTION

Technical Problem

The invention has been made to solve the problems and aims to provides an aluminum alloy plate for a magnetic disk substrate which has a highly flat and smooth plated surface and which can be produced at low cost and a magnetic disk using the aluminum alloy plate.

Solution to Problem

In order to solve the problems, the present inventors have focused on a Ti—V—B—Zr-based inclusion as the inclusion and intensively examined and studied the relationship between the distribution state of the inclusion and the flatness and the smoothness of the plated surface and the relationship between the generation of the inclusion and the production conditions. As a result, the inventors have found that the (Ti+V+Zr) content, the B content, the molten alloy temperature and the holding period in the holding furnace before casting and the molten alloy temperature at the start of casting greatly affect the generation of the Ti—V—B—

Zr-based inclusion and the flatness and the smoothness of the ground surface and completed the invention.

Namely, in claim 1, the present invention is directed to an aluminum alloy plate for a magnetic disk substrate wherein the aluminum alloy plate comprises an aluminum alloy containing Mg: 3.0 to 8.0 mass %, Cu: 0.005 to 0.150 mass %, Zn: 0.05 to 0.60 mass %, Cr: 0.010 to 0.300 mass %, Fe: 0.001 to 0.030 mass %, Si: 0.001 to 0.030 mass %, further containing (Ti+V+Zr): 0.0010 to 0.0100 mass %, B: 0.0001 to 0.0010 mass % with a balance being Al and inevitable impurities and wherein the density of a Ti—V—B—Zr-based inclusion having a maximum diameter exceeding 5 µm is 0 piece/6000 mm$^2$ and the density of a Ti—V—B—Zr-based inclusion having a maximum diameter of 3 to 5 µm is 1 piece/6000 mm$^2$ or less.

Moreover, in claim 2, the invention is directed to a method for producing aluminum alloy plate for a magnetic disk substrate, which produces the aluminum alloy plate for a magnetic disk substrate according to claim 1, comprising a molten alloy holding step of holding a molten aluminum alloy in a holding furnace at 700 to 850° C. for 30 minutes or longer, a casting step of casting an slab from the molten alloy held in the molten alloy holding step, wherein the temperature of the molten alloy at the start of casting is 700 to 850° C., a hot rolling step of hot rolling the cast slab, and a cold rolling step of cold rolling the hot-rolled plate.

In claim 3, the invention is directed to a method for producing a magnetic disk, comprising a step of punching a circular shape out of the aluminum alloy plate for a magnetic disk substrate according to claim 1 and thus preparing a disk blank, a step of flattening the disk blank by pressure annealing, a processing step of lathing, grinding, degreasing and etching the flattened disk blank, a step of zincating the processed aluminum alloy plate, a step of base-plating the zincated aluminum alloy plate, and a step of sputtering a magnetic material to a surface of the base-plated aluminum alloy plate.

Advantageous Effects of Invention

The aluminum alloy substrate for a magnetic disk substrate according to the invention has a plated surface with excellent flatness and excellent smoothness without the use of raw metal with high purity. Thus, an aluminum alloy plate for a magnetic disk substrate achieving a larger capacity and a higher density can be provided at low cost. Moreover, by using such an aluminum alloy plate, a magnetic disk with a large capacity and a high density can be provided.

DESCRIPTION OF EMBODIMENTS

The invention is explained in detail below.

Figure 1:
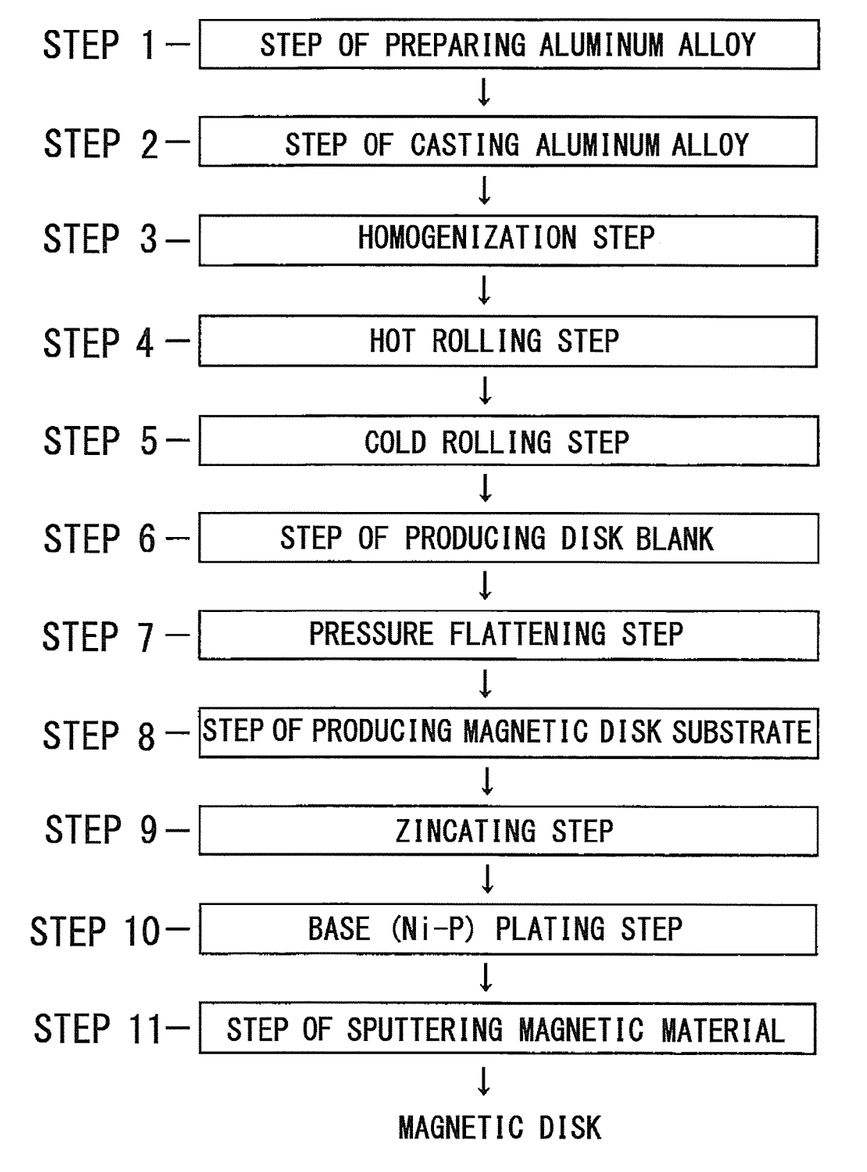
FIG. 1 A flow diagram showing the steps from the production steps of the aluminum alloy plate according to the invention to the production of a magnetic disk.

First, the production steps of an aluminum alloy plate to the production steps of a magnetic disk are explained following the flow shown in FIG. 1. Here, steps 1 to 5 are the steps of producing an aluminum alloy plate, and steps 6 to 11 are the steps of forming the produced aluminum alloy plate into a magnetic disk.

1. Production Steps (1) Step 1: A molten aluminum alloy which has been prepared with the desired composition (for example, prepared with a composition shown in Table 1 below) in a melting furnace is transferred to a holding furnace. Furthermore, the molten alloy is held in the holding furnace at a predetermined temperature for a predetermined period.

(2) Step 2: The prepared molten aluminum alloy is cast.

(3) Step 3: The surfaces of the cast slab are shaved off, and the cast slab is homogenized (the homogenization step is not essential).

(4) Step 4: The surface-shaved or homogenized cast slab is hot rolled into a rolled plate. The plate thickness here is about 3.0 mm.

(5) Step 5: The hot-rolled plate is cold rolled, and an aluminum alloy plate is thus obtained. Annealing is conducted before or during cold rolling (annealing is not essential).

(6) Step 6: A circular shape is punched out of the aluminum alloy plate, and a disk blank is thus produced.

(7) Step 7: The disk blank is flattened by pressure annealing.

(8) Step 8: The flattened disk blank is cut, ground, degreased and etched, and an aluminum alloy substrate for a magnetic disk is thus obtained.

(9) Step 9: A surface of the aluminum alloy substrate for a magnetic disk is zincated (Zn substitution treatment).

(10) Step 10: The zincated surface is subjected to base treatment (Ni—P plating).

(11) Step 11: A magnetic material is affixed to the base-treated surface by sputtering, and a magnetic disk is thus obtained.

2. Aluminum Alloy Composition

First, the respective components of the aluminum alloy in the step 1 are explained in detail. The reasons why the components of the aluminum alloy are limited are as follows.

Mg: 3.0 to 8.0 mass %

Mg is an element mainly having an effect of improving the strength of the aluminum alloy plate. Also, since Mg affixes the zincate film evenly, thinly and finely during zincating, the flatness and the smoothness of the surface with the Ni—P plating, which is applied in the base treatment step after the zincating step, improve. Reasons why the Mg content is limited to 3.0 to 8.0 mass % (hereinafter, simply referred to as "%") are that, when the content is less than 3.0%, the strength is insufficient, and the zincate film formed by zincating becomes uneven, resulting in the deterioration of the adhesiveness, the flatness and the smoothness of the plating. Another reason is that, when the content is more than 8.0%, a coarse Al—Mg-based intermetallic compound is generated, and the intermetallic compound falls off during etching, zincating, lathing or grinding and creates a large hollow, resulting in the deterioration of the flatness and the smoothness of the plated surface. In view of the balance between the strength and the productivity, the Mg content is preferably 3.5 to 7.0%.

Cu: 0.005 to 0.150%

Cu is an element having effects of reducing the amount of molten Al during zincating and affixing the zincate film evenly, thinly and finely. By the effects, Cu improves the flatness and the smoothness of the surface with the Ni—P plating, which is applied in the base treatment step after the zincating step.

One of the reasons why the Cu content is limited to 0.005 to 0.150% is that the effects cannot be obtained sufficiently when the content is less than 0.005%. Another reason is that, when the content is more than 0.150% on the contrary, a coarse Al—Cu—Mg—Zn-based intermetallic compound is generated, and the intermetallic compound falls off during etching, zincating, lathing or grinding and creates a large hollow, resulting in the deterioration of the flatness and the smoothness of the plated surface. Also, when the content is more than 0.150%, the corrosion resistance of the material itself deteriorates, and the zincate film formed by zincating thus becomes uneven. Consequently, the adhesiveness, the flatness and the smoothness of the plating deteriorate, and this is another reason for the limitation. A preferable Cu content is 0.005 to 0.100%.

Zn: 0.05 to 0.60%

In same manner as Cu, Zn reduces the amount of molten Al during zincating and affixes the zincate film evenly, thinly and finely. Thus, the flatness and the smoothness of the surface with the Ni—P plating, which is applied in the base treatment step after the zincating step, improve.

One of the reasons why the Zn content is limited to 0.05 to 0.60% is that the effects cannot be obtained sufficiently when the content is less than 0.05%. Another reason is that, when the content is more than 0.60% on the contrary, a coarse Al—Cu—Mg—Zn-based intermetallic compound is generated, and the intermetallic compound falls off during etching, zincating, lathing or grinding and creates a large hollow, resulting in the deterioration of the flatness and the smoothness of the plated surface. Moreover, when the content is more than 0.60%, the formability and the corrosion resistance of the material itself deteriorate, and the zincate film formed by zincating thus becomes uneven. Consequently, the adhesiveness, the flatness and the smoothness of the plating deteriorate, and this is another reason for the limitation. A preferable Zn content is 0.05 to 0.50%.

Cr: 0.010 to 0.300%

Cr is an element which generates a fine intermetallic compound during casting but which contributes to the improvement of the strength by partially entering into solid solution in the matrix. Cr also has effects of improving the cuttability and grindability, and of inhibiting the generation of plating pits by improving the adhesiveness of the plating layer with micronizing of the recrystallized structure.

One of the reasons why the Cr content is limited to 0.010 to 0.300% is that the effects cannot be obtained sufficiently when the content is less than 0.010%. On the other hand, when the content is more than 0.300%, the excess part is crystallized during casting. At the same time, a coarse Al—Cr-based intermetallic compound is generated, and the intermetallic compound falls off during etching, zincating, lathing or grinding and creates a large hollow, which is a cause of a plating pit. These are other reasons for the limitation. A preferable Cr content is 0.010 to 0.200%.

Fe: 0.001 to 0.030%

Fe hardly enters into solid solution in the aluminum base material but is contained in the raw aluminum as an Al—Fe-based intermetallic compound. Since the Al—Fe-based intermetallic compound causes a defect of the ground surface, it is not preferable that the aluminum alloy contains Fe. However, to reduce the Fe content to less than 0.001% means to refine the raw aluminum to high purity, resulting in high cost. On the other hand, when the Fe content is more than 0.030%, a coarse Al—Fe-based intermetallic compound is generated, and the coarse Al—Fe-based intermetallic compound falls off during etching, zincating, lathing or grinding and creates a large hollow, resulting in the deterioration of the flatness and the smoothness of the plated surface. Therefore, the Fe content is adjusted to 0.001 to 0.030%. A preferable Fe content is 0.001 to 0.025%.

Si: 0.001 to 0.030%

Si binds to Mg, which is an essential element of the aluminum alloy plate of the invention, and generates an Mg—Si-based intermetallic compound, which causes a defect of the ground surface. Thus, it is not preferable that the aluminum alloy contains Si. However, Si is contained in the raw aluminum as inevitable impurities. Raw aluminum with high purity, for example purity of 99.9% or more, is used for preparing the aluminum alloy in the step 1, and such raw metal also contains Si. To reduce the Si content in the raw aluminum to less than 0.001% means to refine the raw aluminum to high purity, resulting in high cost. On the other hand, when the Si content is more than 0.030%, a coarse Mg—Si-based intermetallic compound is generated, and the coarse Mg—Si-based intermetallic compound falls off during etching, zincating, lathing or grinding and creates a large hole, resulting in the deterioration of the flatness and the smoothness of the plated surface. Therefore, the Si content is adjusted to 0.001 to 0.030%. A preferable Si content is 0.001 to 0.025%.

(Ti+V+Zr): 0.0010 to 0.0100%

Ti, V and Zr bind to B and generate a Ti—V—B—Zr-based inclusion, which causes a defect of the ground surface. Thus, it is not preferable that the aluminum alloy contains Ti, V or Zr. However, Ti, V and Zr are contained in the raw aluminum as inevitable impurities. To reduce the total Ti, V and Zr content in the raw aluminum to less than 0.0010% means to refine the raw aluminum to high purity, resulting in high cost. On the other hand, when the total Ti, V and Zr content is more than 0.0100%, a coarse Ti—V—B—Zr-based inclusion is generated. A grinding scratch is caused from the inclusion during grinding, or the inclusion falls off and creates a large hole, resulting in the deterioration of the flatness and the smoothness of the plated surface. Therefore, the total Ti, V and Zr content is adjusted to 0.0010 to 0.0100%. A preferable total Ti, V and Zr content is 0.0010 to 0.0060%.

Preferable contents of Ti, V and Zr elements are Ti: 0.0003 to 0.0050%, V: 0.0006 to 0.0050% and Zr: 0.0001 to 0.0010%. When all of the three elements are contained, the total Ti, V and Zr content means the total of the contents of the three elements. When any two thereof are contained, the total content means the total of the contents of the two elements. When any one thereof only is contained, the total content means the content of the element.

B: 0.0001 to 0.0010%

B binds to Ti, V and Zr and generates a Ti—V—B—Zr-based inclusion, which causes a defect of the ground surface. Thus, it is not preferable that the aluminum alloy contains B. However, B is contained in the raw aluminum as inevitable impurities. To reduce the B content in the raw aluminum to less than 0.0001% means to refine the raw aluminum to high purity, resulting in high cost. On the other hand, when the B content is more than 0.0010%, a coarse Ti—V—B—Zr-based inclusion is generated. A grinding scratch is caused from the inclusion during grinding, or the inclusion falls off and creates a large hole, resulting in the deterioration of the flatness and the smoothness of the plated surface. Therefore, the B content is adjusted to 0.0001 to 0.0010%. A preferable B content is 0.0001 to 0.0005%.

Other Elements

A small amount of Be may be added during casting to inhibit the oxidation of molten by Mg. However, the effect cannot be obtained sufficiently when the Be content is less than 0.0001%, while, even when Be is added in an amount exceeding 0.0050%, the effect of the addition saturates, and a further significant improvement effect cannot be obtained. Therefore, when Be is added, the amount thereof is preferably 0.0001 to 0.0050%.

Components other than the above elements are Al and inevitable impurities. The inevitable impurities here are elements except for Mg, Cu, Zn, Cr, Fe, Si, Ti, V, Zr, B and Be and are for example Mn, Ga and the like. The inevitable impurities do not impair the properties of the aluminum alloy plate according to the invention when the amount of each element is 0.03% or less and the total amount is 0.15% or less.

3. Densities of Ti—V—B—Zr-Based Inclusions

In the invention, the density of a Ti—V—B—Zr-based inclusion having a maximum diameter exceeding 5 μm is 0 piece/6000 mm$^2$, and the density of a Ti—V—B—Zr-based inclusion having a maximum diameter of 3 to 5 μm is 1 piece/6000 mm$^2$ or less. Here, the Ti—V—B—Zr-based inclusions defined in the invention are inclusions in which it can be confirmed by WDS analysis using an electron probe microanalyzer (EPMA) that Ti, V, B and Zr are contained. The maximum diameter in the invention is determined as follows. First, in a planar image of a Ti—V—B—Zr-based inclusion obtained by WDS analysis using an electron probe microanalyzer (EPMA), the largest value of the distances between a point on the outline and the other points on the outline is measured, and then such largest values are measured for all the points on the outline. The maximum diameter is the maximum value finally selected from all of the largest values.

In the aluminum alloy plate, the density of a Ti—V—B—Zr-based inclusion having a maximum diameter exceeding 5 μm is 0 piece/6000 mm$^2$ and the density of a Ti—V—B—Zr-based inclusion having a maximum diameter of 3 to 5 μm is 1 piece/6000 mm$^2$ or less. As a result, a large hollow or a grinding scratch is less likely to be caused on the substrate surface during grinding or pre-plating treatment, and a flat and smooth plated surface can be obtained. When there is a Ti—V—B—Zr-based inclusion on the substrate surface, a grinding scratch is caused in a wide area from the inclusion during grinding, and thus the dispersion state of the inclusion can be visually observed. When the maximum diameter of a Ti—V—B—Zr-based inclusion contained in the aluminum alloy plate is more than 5 μm, a large hole or a grinding scratch is caused on the substrate surface due to the inclusion, and the flatness and the smoothness of the plated surface deteriorate. On the other hand, when the maximum diameter of a Ti—V—B—Zr-based inclusion contained in the aluminum alloy plate is 3 to 5 the size of a hole or a grinding scratch caused due to the inclusion slightly affects the generation of a plating pit. However, when the density of the Ti—V—B—Zr-based inclusion having a maximum diameter of 3 to 5 μm is one piece or less per 6000 mm$^2$, the influence on the pit generation can be ignored. When the maximum diameter of a Ti—V—B—Zr-based inclusion contained in the aluminum alloy plate is less than 3 μm, it is not considered that a hole or a grinding scratch caused due to the inclusion is a problem. Here, the density of the Ti—V—B—Zr-based inclusion having a maximum diameter of 3 to 5 μm should be 1 piece/6000 mm$^2$ or less but is preferably 0 piece/6000 mm$^2$.

4. Production Method of Aluminum Alloy Plate for Magnetic Disk Substrate

Next, the method for producing the aluminum alloy plate for a magnetic disk substrate according to the invention is explained in detail. In the step 1, the molten aluminum alloy which has been adjusted to fall in the alloy composition range of the invention is heated and held in a holding furnace so that the molten aluminum alloy does not become cold and hard before casting. Subsequently, the molten aluminum alloy is cast according to a general method such as the Direct Chill Casting (DC casting) method (the step 2), and the obtained cast slab is homogenized (the step 3), hot rolled (the step 4) and cold rolled (the step 5), thereby producing an aluminum alloy plate. Although all of the steps affect the distribution state of the Ti—V—B—Zr-based inclusions, the inventors have focused especially on the heating temperature and the holding period in the holding furnace in the step 1 and the molten alloy temperature at the start of casting.

4-1. Heating Temperature of Molten Alloy in Holding Furnace: 700 to 850° C.

By adjusting the heating temperature of the molten alloy in the holding furnace to 700 to 850° C., a part of the Ti—V—B—Zr-based inclusion melts into the molten alloy, and the amount of the inclusion can be thus reduced. When the heating temperature of the molten alloy in the holding furnace is lower than 700° C., a Ti—V—B—Zr-based inclusion having a maximum diameter of 3 μm or more is generated in a large amount during holding, and such inclusion cannot be removed sufficiently even by holding at such a temperature lower than 700° C. for a long time and remains in the molten aluminum alloy. As a result, a large hole and a grinding scratch are caused on the substrate surface due to the inclusion, and the flatness and the smoothness of the plated surface deteriorate. On the other hand, when the heating temperature of the molten alloy in the holding furnace is higher than 850° C., the cost increases because the electric power consumption and the like increase. Therefore, the heating temperature of the molten alloy in the holding furnace is 700 to 850° C. A preferable heating temperature of the molten alloy in the holding furnace is 750 to 850° C.

4-2. Holding Period of Molten Alloy in Holding Furnace: 30 Minutes or Longer

By adjusting the holding period of the molten alloy in the holding furnace to 30 minutes or longer, the Ti—V—B—Zr-based inclusion having a maximum diameter of 3 μm or more which has not molten into the molten alloy can be precipitated and removed. The holding period of the molten alloy in the holding furnace means the period in which the molten aluminum alloy is held after the alloy prepared in the melting furnace is entirely transferred to the holding furnace and subjected to treatment such as degassing in the furnace. When the holding period of the molten alloy in the holding furnace is shorter than 30 minutes, the inclusion is not precipitated sufficiently and remains in the molten aluminum alloy. As a result, a large hole and a grinding scratch are caused on the substrate surface due to the inclusion, and the flatness and the smoothness of the plated surface deteriorate. Therefore, the holding period of the molten alloy in the holding furnace is 30 minutes or longer. A preferable holding period of the molten alloy in the holding furnace is 60 minutes or longer. The longer the holding period of the molten alloy in the holding furnace is, the better it is, but the holding period is preferably 600 minutes or shorter from the economical viewpoint.

4-3. Inline Treatment

After the molten alloy is held in the holding furnace, the molten alloy is preferably degassed and filtered inline according to general methods before casting the alloy. As the inline degassing apparatus, commercially available apparatuses with trade names such as SNIF and ALPUR can be used. In these apparatuses, while argon gas or a mixed gas of argon and chlorine is blown into the molten alloy, a rotor with a blade is rotated with high speed to supply the gas as fine bubbles to the molten alloy. As a result, the removal of hydrogen gas and the removal of the inclusions can be conducted inline in a short time. For the inline filtration, a ceramic tube filter, a ceramic foam filter, an alumina ball filter or the like is used, and the inclusions are removed by the cake filtration mechanism or the filtration mechanism through a filter material.

4-4. Molten Alloy Temperature at Start of Casting: 700 to 850° C.

When the molten alloy is degassed and filtered inline after the molten alloy is held in the holding furnace, the molten alloy temperature sometimes lowers. Thus, the molten alloy temperature at the start of casting is adjusted to 700 to 850° C. as same as the heating temperature of the molten alloy in the holding furnace. When the molten alloy temperature at the start of casting is lower than 700° C., a Ti—V—B—Zr-based inclusion having a maximum diameter of 3 μm or more is generated in a large amount before starting casting. As a result, a large hole and a grinding scratch are caused on the substrate surface due to the inclusion, and the flatness and the smoothness of the plated surface deteriorate. On the other hand, to keep the molten alloy temperature at the start of casting higher than 850° C., the cost increases because the electric power consumption and the like increase. Therefore, the molten alloy temperature at the start of casting is 700 to 850° C. A preferable molten alloy temperature at the start of casting is 700 to 800° C.

After the molten alloy is held in the holding furnace, the molten alloy is cast and then homogenized according to the need. When homogenization is conducted, the homogenization is preferably conducted for example under the conditions of 500 to 570° C. for 1 to 10 hours. Then, conducted to be hot rolled, the conditions are not particularly limited. For example, the hot rolling start temperature is 400 to 500° C., and the hot rolling finish temperature is 260 to 380° C.

After hot rolling is finished, the plate is finished by cold rolling into the plate thickness of a desired product. The conditions of cold rolling are not particularly limited and may be determined according to the necessary strength and the necessary plate thickness of the product. For example, the reduction of is 20 to 80%.

Annealing may be conducted to secure the cold-rolling formability before cold rolling or during cold rolling. When annealing is conducted, annealing is conducted preferably under the conditions of 250 to 430° C. for 0.1 to 10 hours in case of batch-type heating and conducted preferably under the holding conditions of 400 to 500° C. for 0 to 60 seconds in case of continuous heating.

Thus produced aluminum alloy plate is processed according to the application. In order to process the aluminum alloy plate to obtain a plate for a magnetic disk, a circular shape is punched out of the aluminum alloy plate (the step 6), and the plate is pressure annealed in the atmosphere at 250 to 430° C. for 30 minutes or longer (the step 7). The flattened disk blank is cut, ground, degreased and etched (the step 8), then zincated (the step 9) and base-plated (the step 10). A magnetic material is affixed thereto by sputtering (the step 11) to obtain a magnetic disk.

Examples

The invention is explained in more detail below by Examples used for magnetic disk substrates. First, the steps in FIG. 1 are explained.

(1) Step 1: Molten aluminum alloys having the respective composition shown in Table 1 were meltingly produced. The molten alloys were held in a holding furnace under the respective conditions shown in Table 2.

(2) Step 2: Cast slabs each with a thickness of 500 mm were produced from the molten aluminum alloys by the DC casting method, and both surfaces of each cast slab were shaved off by 15 mm.

(3) Step 3: The alloys, except for the alloy No. 6 in Table 1, were homogenized at 510° C. for 6 hours.

(4) Step 4: Hot rolling was conducted at a rolling start temperature of 460° C. and a rolling finish temperature of 340° C., and hot-rolled plates each with a plate thickness of 3.0 mm were obtained.

(5) Step 5: The hot-rolled plates, except for the alloy of Example No. 7, were cold rolled (reduction of 66.7%) to a final plate thickness of 1.0 mm without conducting process annealing, and aluminum alloy plates were thus obtained.

In Example No. 7, after first cold rolling (reduction of 33.3%), process annealing was conducted under the conditions of 300° C. for two hours using a batch-style annealing furnace. Next, the alloy was rolled by second cold rolling (reduction of 50.0%) to a final plate thickness of 1.0 mm, and an aluminum alloy plate was thus obtained.

(6) Step 6: A circular shape with an outer diameter of 96 mm and an inner diameter of 24 mm was punched out of each of the aluminum alloy plates, and disk blanks were thus produced.

(7) Step 7: The disk blanks were pressure annealed at 340° C. for four hours.

(8) Step 8: End-face machining was conducted to reduce the outer diameters to 95 mm and the inner diameters to 25 mm, and grinding was conducted (the surfaces of 10 μm in depth were ground off). Subsequently, degreasing was conducted by AD-68F (manufactured by C. Uyemura & Co., Ltd.) at 60° C. for five minutes, and etching was conducted by AD-107F (manufactured by C. Uyemura & Co., Ltd.) at 65° C. for 1 minute. Furthermore, the disk blanks were desmutted with an aqueous 30% $HNO_3$ solution (room temperature) for 20 seconds.

(9) Step 9: The surfaces of the surface-treated disk blanks were subjected to double zincating using AD-301F-3X (manufactured by C. Uyemura & Co., Ltd.).

(10) Step 10: The zincated surfaces were subjected to electroless plating with Ni—P with a thickness of 17 μm using an electroless Ni—P plating solution (Nimuden HDX (manufactured by C. Uyemura & Co., Ltd.) and then finished by final polishing with a buffing pad (polishing amount of 4 μm).

TABLE 1

| | Alloy No. | Component (mass %) | | | | | | | | | | |
| --- | --- | --- | --- | --- | --- | --- | --- | --- | --- | --- | --- | --- |
| | | Mg | Cu | Zn | Cr | Fe | Si | Ti | V | Zr | B | Al + inevitable impurities | Ti + V + Zr |
| Example | 1 | 4.3 | 0.148 | 0.05 | 0.020 | 0.020 | 0.023 | 0.0027 | 0.0039 | 0.0003 | 0.0003 | Balance | 0.0069 |
| | 2 | 3.7 | 0.088 | 0.47 | 0.090 | 0.023 | 0.015 | 0.0004 | 0.0006 | 0.0001 | 0.0010 | Balance | 0.0011 |
| | 3 | 3.0 | 0.023 | 0.59 | 0.070 | 0.017 | 0.023 | 0.0011 | 0.0013 | 0.0007 | 0.0003 | Balance | 0.0031 |
| | 4 | 4.5 | 0.046 | 0.11 | 0.070 | 0.016 | 0.001 | 0.0024 | 0.0035 | 0.0006 | 0.0001 | Balance | 0.0065 |

TABLE 1-continued

| | Alloy No. | Mg | Cu | Zn | Cr | Fe | Si | Ti | V | Zr | B | Al + inevitable impurities | Ti + V + Zr |
|---|---|---|---|---|---|---|---|---|---|---|---|---|---|
| | 5 | 5.4 | 0.006 | 0.19 | 0.010 | 0.029 | 0.029 | 0.0021 | 0.0015 | 0.0002 | 0.0004 | Balance | 0.0038 |
| | 6 | 6.8 | 0.034 | 0.33 | 0.110 | 0.018 | 0.020 | 0.0010 | 0.0012 | 0.0010 | 0.0002 | Balance | 0.0032 |
| | 7 | 7.9 | 0.028 | 0.39 | 0.290 | 0.001 | 0.016 | 0.0046 | 0.0048 | 0.0002 | 0.0001 | Balance | 0.0096 |
| Comparative Example | 8 | 8.3 | 0.084 | 0.39 | 0.080 | 0.017 | 0.025 | 0.0013 | 0.0037 | 0.0008 | 0.0002 | Balance | 0.0058 |
| | 9 | 5.0 | 0.167 | 0.25 | 0.150 | 0.011 | 0.019 | 0.0023 | 0.0022 | 0.0010 | 0.0002 | Balance | 0.0055 |
| | 10 | 4.4 | 0.082 | 0.68 | 0.080 | 0.025 | 0.012 | 0.0010 | 0.0038 | 0.0008 | 0.0002 | Balance | 0.0056 |
| | 11 | 3.9 | 0.008 | 0.25 | 0.340 | 0.017 | 0.017 | 0.0004 | 0.0040 | 0.0010 | 0.0001 | Balance | 0.0054 |
| | 12 | 3.6 | 0.079 | 0.34 | 0.030 | 0.035 | 0.022 | 0.0017 | 0.0031 | 0.0004 | 0.0002 | Balance | 0.0052 |
| | 13 | 3.8 | 0.011 | 0.30 | 0.100 | 0.011 | 0.035 | 0.0003 | 0.0013 | 0.0006 | 0.0002 | Balance | 0.0022 |
| | 14 | 4.7 | 0.032 | 0.44 | 0.100 | 0.020 | 0.025 | 0.0049 | 0.0050 | 0.0010 | 0.0006 | Balance | 0.0109 |
| | 15 | 4.5 | 0.084 | 0.46 | 0.120 | 0.021 | 0.010 | 0.0025 | 0.0035 | 0.0002 | 0.0015 | Balance | 0.0062 |
| | 16 | 2.7 | 0.023 | 0.47 | 0.070 | 0.023 | 0.023 | 0.0011 | 0.0013 | 0.0001 | 0.0003 | Balance | 0.0025 |
| | 17 | 5.0 | 0.002 | 0.16 | 0.140 | 0.012 | 0.014 | 0.0026 | 0.0024 | 0.0001 | 0.0010 | Balance | 0.0051 |
| | 18 | 4.0 | 0.091 | 0.03 | 0.010 | 0.021 | 0.019 | 0.0010 | 0.0032 | 0.0007 | 0.0006 | Balance | 0.0049 |
| | 19 | 4.4 | 0.037 | 0.20 | 0.005 | 0.022 | 0.014 | 0.0023 | 0.0026 | 0.0002 | 0.0008 | Balance | 0.0051 |
| | 20 | 3.9 | 0.060 | 0.49 | 0.130 | 0.013 | 0.017 | 0.0020 | 0.0033 | 0.0003 | 0.0006 | Balance | 0.0056 |
| | 21 | 5.0 | 0.079 | 0.40 | 0.130 | 0.012 | 0.019 | 0.0019 | 0.0015 | 0.0002 | 0.0007 | Balance | 0.0036 |
| | 22 | 3.7 | 0.062 | 0.46 | 0.030 | 0.010 | 0.015 | 0.0019 | 0.0036 | 0.0003 | 0.0003 | Balance | 0.0058 |
| | 23 | 4.4 | 0.041 | 0.49 | 0.010 | 0.025 | 0.010 | 0.0011 | 0.0027 | 0.0002 | 0.0004 | Balance | 0.0040 |

TABLE 2

| | | Casting Conditions | | |
|---|---|---|---|---|
| | Alloy No. | Heating Temperature of Molten Alloy in Holding Furnace (° C.) | Holding Period of Molten Alloy in Holding Furnace (Minutes) | Molten Alloy Temperature at Start of Casting (° C.) |
| Example | 1 | 806 | 91 | 798 |
| | 2 | 778 | 69 | 768 |
| | 3 | 705 | 590 | 702 |
| | 4 | 776 | 117 | 770 |
| | 5 | 842 | 38 | 830 |
| | 6 | 788 | 63 | 782 |
| | 7 | 766 | 33 | 760 |
| Comparative Example | 8 | 817 | 97 | 808 |
| | 9 | 813 | 104 | 802 |
| | 10 | 798 | 92 | 791 |
| | 11 | 776 | 99 | 771 |
| | 12 | 850 | 73 | 838 |
| | 13 | 786 | 106 | 774 |
| | 14 | 787 | 67 | 777 |
| | 15 | 750 | 108 | 745 |
| | 16 | 776 | 91 | 770 |
| | 17 | 754 | 85 | 750 |
| | 18 | 805 | 65 | 798 |
| | 19 | 825 | 98 | 815 |
| | 20 | 690 | 86 | 685 |
| | 21 | 682 | 89 | 680 |
| | 22 | 821 | 25 | 810 |
| | 23 | 767 | 20 | 761 |

The aluminum alloy plates were evaluated as follows after grinding (the step 8) and after plating (the step 10).

[Densities of Ti—V—B—Zr-Based Inclusions]

The densities of the Ti—V—B—Zr-based inclusion having a maximum diameter of 3 to 5 μm and the Ti—V—B—Zr-based inclusion having a maximum diameter exceeding 5 μm (piece/6000 mm$^2$) were determined by: visually examining the surface of an aluminum alloy plate after grinding; counting the numbers of the pieces of the Ti—V—B—Zr-based inclusion having a maximum diameter of 3 to 5 μm and the Ti—V—B—Zr-based inclusion having a maximum diameter exceeding 5 μm per 6597 mm$^2$ while identifying the inclusions through an EPMA observation image and WDS analysis (wavelength dispersive X-ray spectroscopy); and converting the numbers to densities (piece/6000 mm$^2$). When there is a Ti—V—B—Zr-based inclusion on the substrate surface, a grinding scratch is caused in a wide area from the inclusion during grinding. Thus, the distribution state of the inclusions can be visually observed. The densities are shown in Table 3.

TABLE 3

| | Alloy No. | Density of Ti—V—B—Zr-Based Inclusion having Maximum Diameter exceeding 5 μm (piece/6000 mm$^2$) | Density of Ti—V—B—Zr-Based Inclusion having Maximum Diameter of 3-5 μm (piece/6000 mm$^2$) | Flatness and Smoothness of Plated Surface Distribution of Plating Pits having Maximum Diameter of 1 μm or More (piece/6000 mm$^2$) | Evaluation |
|---|---|---|---|---|---|
| Example | 1 | 0 | 0 | 0 | A |
| | 2 | 0 | 0 | 0 | A |

TABLE 3-continued

|  | Alloy No. | Density of Ti—V—B—Zr-Based Inclusion having Maximum Diameter exceeding 5 μm (piece/6000 mm$^2$) | Density of Ti—V—B—Zr-Based Inclusion having Maximum Diameter of 3-5 μm (piece/6000 mm$^2$) | Flatness and Smoothness of Plated Surface Distribution of Plating Pits having Maximum Diameter of 1 μm or More (piece/6000 mm$^2$) | Evaluation |
|---|---|---|---|---|---|
|  | 3 | 0 | 0 | 0 | A |
|  | 4 | 0 | 0 | 0 | A |
|  | 5 | 0 | 1 | 1 | B |
|  | 6 | 0 | 0 | 0 | A |
|  | 7 | 0 | 1 | 1 | B |
| Comparative Example | 8 | 0 | 0 | 12 | C |
|  | 9 | 0 | 0 | 9 | C |
|  | 10 | 0 | 0 | 6 | C |
|  | 11 | 0 | 0 | 38 | C |
|  | 12 | 0 | 0 | 24 | C |
|  | 13 | 0 | 0 | 7 | C |
|  | 14 | 3 | 3 | 3 | C |
|  | 15 | 2 | 2 | 2 | C |
|  | 16 | 0 | 0 | 3 | C |
|  | 17 | 0 | 0 | 3 | C |
|  | 18 | 0 | 0 | 4 | C |
|  | 19 | 0 | 0 | 3 | C |
|  | 20 | 3 | 3 | 3 | C |
|  | 21 | 5 | 5 | 5 | C |
|  | 22 | 0 | 2 | 4 | C |
|  | 23 | 0 | 2 | 3 | C |

[Flatness and Smoothness of Plated Surface]

The surface of an aluminum alloy plate after plating with Ni—P was observed using a device such as OSA (Optical Surface Analyzer). The number of pits having a maximum diameter of 1 μm or more per 6597 mm$^2$ was counted, and the number per unit area (density: piece/6000 mm$^2$) was determined. The evaluation criteria were as follows: plates with pits of 0 piece/6000 mm$^2$ were determined to be excellent (mark A); plates with pits of 1 piece/6000 mm$^2$ were determined to be good (mark B); and plates with pits of 2 piece/6000 mm$^2$ or more were determined to be poor (mark C). The evaluation results are shown in Table 3.

As shown in Table 3, in Examples 1 to 7, the densities of the Ti—V—B—Zr-based inclusion having a maximum diameter of 3 to 5 μm and the Ti—V—B—Zr-based inclusion having a maximum diameter exceeding 5 μm satisfied the requirements of claim 1, and aluminum alloy plates for a magnetic disk substrate having plated surfaces with excellent or good flatness and smoothness were obtained.

On the other hand, all of Comparative Examples 8 to 23 contained a constituent element which was outside the defined scope of the invention, and thus the flatness and the smoothness of the plated surfaces were poor.

That is, in Comparative Example 8, since the Mg content was too high, a coarse Al—Mg-based intermetallic compound was generated in a large amount, and the intermetallic compound fell off during the pre-plating treatment and created large holes in the aluminum alloy plate surface. As a result, many pits were generated on the plated surface, and the flatness and the smoothness of the plated surface were poor.

In Comparative Example 9, since the Cu content was too high, a coarse Al—Cu—Mg—Zn-based intermetallic compound was generated in a large amount, and the intermetallic compound fell off during the pre-plating treatment and created large holes in the aluminum alloy plate surface. As a result, many pits were generated on the plated surface, and the flatness and the smoothness of the plated surface were poor.

In Comparative Example 10, since the Zn content was too high, a coarse Al—Cu—Mg—Zn-based intermetallic compound was generated in a large amount, and the intermetallic compound fell off during the pre-plating treatment and created large holes in the aluminum alloy plate surface. As a result, many pits were generated on the plated surface, and the flatness and the smoothness of the plated surface were poor.

In Comparative Example 11, since the Cr content was too high, a coarse Al—Cr-based intermetallic compound was generated in a large amount, and the intermetallic compound fell off during the pre-plating treatment and created large holes in the aluminum alloy plate surface. As a result, many pits were generated on the plated surface, and the flatness and the smoothness of the plated surface were poor.

In Comparative Example 12, since the Fe content was too high, a coarse Al—Fe-based intermetallic compound was generated in a large amount, and the intermetallic compound fell off during the pre-plating treatment and created large holes in the aluminum alloy plate surface. As a result, many pits were generated on the plated surface, and the flatness and the smoothness of the plated surface were poor.

In Comparative Example 13, since the Si content was too high, a coarse Mg—Si-based intermetallic compound was generated in a large amount, and the intermetallic compound fell off during the pre-plating treatment and created large holes in the aluminum alloy plate surface. As a result, many pits were generated on the plated surface, and the flatness and the smoothness of the plated surface were poor.

In Comparative Example 14, since the (Ti+V+Zr) content was too high, a coarse Ti—V—B—Zr-based inclusion was generated in a large amount, and many large holes and many grinding scratches were caused on the aluminum alloy plate surface during grinding and the pre-plating treatment. As a result, many pits were generated on the plated surface, and the flatness and the smoothness of the plated surface were poor.

In Comparative Example 15, since the B content was too high, a coarse Ti—V—B—Zr-based inclusion was generated in a large amount, and many large holes and many grinding scratches were caused on the aluminum alloy plate surface during grinding and the pre-plating treatment. As a result, many pits were generated on the plated surface, and the flatness and the smoothness of the plated surface were poor.

In Comparative Example 16, since the Mg content was too low, the zincate film was uneven. As a result, many pits were generated on the plated surface, and the flatness and the smoothness of the plated surface were poor.

In Comparative Example 17, since the Cu content was too low, the zincate film was uneven. As a result, many pits were generated on the plated surface, and the flatness and the smoothness of the plated surface were poor.

In Comparative Example 18, since the Zn content was too low, the zincate film was uneven. As a result, many pits were generated on the plated surface, and the flatness and the smoothness of the plated surface were poor.

In Comparative Example 19, since the Cr content was too low, coarse crystal grains grew in the aluminum alloy plate, and the adhesiveness of the plating deteriorated. As a result, many pits were generated on the plated surface, and the flatness and the smoothness of the plated surface were poor.

In Comparative Examples 20 and 21, since the heating temperatures of the molten alloys in the holding furnace and the molten alloy temperatures at the start of casting were too low, a coarse Ti—V—B—Zr-based inclusion was generated in a large amount, and many large holes and many grinding scratches were caused on the aluminum alloy plate surfaces during grinding and the pre-plating treatment. As a result, many pits were generated on the plated surfaces, and the flatness and the smoothness of the plated surfaces were poor.

In Comparative Examples 22 and 23, since the holding periods of the molten alloys in the holding furnace were too short, a large amount of a coarse Ti—V—B—Zr-based inclusion remained, and many large holes and many grinding scratches were caused on the aluminum alloy plate surfaces during grinding and the pre-plating treatment. As a result, many pits were generated on the plated surface, and the flatness and the smoothness of the plated surface were poor.

INDUSTRIAL APPLICABILITY

As described above, in the aluminum alloy plate for a magnetic disk substrate according to the invention, the number of Ti—V—B—Zr-based inclusion pieces having a maximum diameter of 3 μm or more is limited before grinding, the pre-plating treatment and the like. Thus, the aluminum alloy plate has an effect of inhibiting the generation of a hole and a grinding scratch, and a plated surface with excellent flatness and smoothness can be obtained. Also, since a plated surface with excellent flatness and smoothness can be obtained without the use of raw metal with high purity, the invention also has an excellent effect of providing an aluminum alloy plate for a magnetic disk substrate achieving a larger capacity and a higher density at low cost. Moreover, by using such an aluminum alloy plate, a magnetic disk with a large capacity and a high density can be obtained.

The invention claimed is:

1. An aluminum alloy plate for a magnetic disk substrate wherein the aluminum alloy plate comprises an aluminum alloy containing Mg: 3.0 to 8.0 mass %, Cu: 0.005 to 0.150 mass %, Zn: 0.05 to 0.60 mass %, Cr: 0.010 to 0.300 mass %, Fe: 0.001 to 0.030 mass %, Si: 0.001 to 0.030 mass %, further containing (Ti+V+Zr):0.0010 to 0.0100 mass %, B: 0.0001 to 0.0010 mass % with a balance being Al and inevitable impurities and wherein the density of a Ti—V—B—Zr-based inclusion having a maximum diameter exceeding 5 μm is 0 piece/6000 mm$^2$ and the density of a Ti—V—B—Zr-based inclusion having a maximum diameter of 3 to 5 μm is 1 piece/6000 mm$^2$ or less.

2. A method for producing aluminum alloy plate for a magnetic disk substrate, which produces the aluminum alloy plate for a magnetic disk substrate according to claim 1, comprising a molten alloy holding step of holding a molten aluminum alloy in a holding furnace at 700 to 850° C. for 30 minutes or longer, a casting step of casting a slab from the molten alloy held in the molten alloy holding step, wherein the temperature of the molten alloy at the start of casting is 700 to 850° C., a hot rolling step of hot rolling the cast slab, and a cold rolling step of cold rolling the hot-rolled plate.

3. A method for producing a magnetic disk, comprising a step of punching a circular shape out of the aluminum alloy plate for a magnetic disk substrate according to claim 1 and thus preparing a disk blank, a step of flattening the disk blank by pressure annealing, a processing step of lathing, grinding, degreasing and etching the flattened disk blank, a step of zincating the processed aluminum alloy plate, a step of base-plating the zincated aluminum alloy plate, and a step of sputtering a magnetic material to a surface of the base-plated aluminum alloy plate.

* * * * *